United States Patent
Becker et al.

(10) Patent No.: US 6,311,485 B1
(45) Date of Patent: Nov. 6, 2001

(54) GAS EXHAUST SYSTEM

(75) Inventors: Manfred Becker, Lohmar-Heide; Bernhard Hoffschmidt, Gladbach; Josef Meurer, Troisdorf, all of (DE)

(73) Assignees: Deutsches Zentrum fuer, Bonn (DE); Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/486,043

(22) PCT Filed: Aug. 7, 1998

(86) PCT No.: PCT/EP98/05022
§ 371 Date: Apr. 27, 2000
§ 102(e) Date: Apr. 27, 2000

(87) PCT Pub. No.: WO99/10634
PCT Pub. Date: Mar. 4, 1999

(30) Foreign Application Priority Data

Aug. 22, 1997 (DE) .............................. 197 36 638
Aug. 30, 1997 (DE) .............................. 197 38 021
Nov. 15, 1997 (DE) .............................. 197 50 733

(51) Int. Cl.$^7$ ........................................... F01N 7/00
(52) U.S. Cl. ............................. 60/324; 60/299; 422/176; 422/211; 422/220
(58) Field of Search .................. 60/299, 302, 324; 422/171, 176, 177, 180, 211, 220

(56) References Cited

U.S. PATENT DOCUMENTS

| | | | |
|---|---|---|---|
| 3,749,130 | * 7/1973 | Howitt et al. | 422/177 |
| 3,755,204 | * 8/1973 | Sergeys | 422/180 |
| 3,964,875 | * 6/1976 | Chang et al. | 422/176 |
| 4,065,918 | * 1/1978 | Rifkin | 60/299 |
| 4,576,799 | * 3/1986 | Wörner et al. | 60/299 |
| 4,719,090 | * 1/1988 | Masaki | 422/171 |
| 5,403,559 | * 4/1995 | Swars | 60/299 |
| 5,651,946 | * 7/1997 | Dekumbis et al. | 422/180 |
| 5,792,432 | * 8/1998 | Kato et al. | 422/171 |

FOREIGN PATENT DOCUMENTS

0433222 A1 * 6/1991 (EP) .

* cited by examiner

Primary Examiner—Thomas Denion
Assistant Examiner—Tu M. Nguyen
(74) Attorney, Agent, or Firm—Diller, Ramik & Wight

(57) ABSTRACT

The gas exhaust system, intended for an internal combustion engine, has a plurality of connectors leading to an exhaust manifold. The exhaust vent from the exhaust manifold is used as a feed gas for a catalyst. In order to install said catalyst as close as possible to the exhaust manifold, it is suggested by the invention that a mixer be provided inside the catalyst housing. The mixer enables the exhaust gas stream arriving at the catalyst via the feed pipe to be homogenized in time and geometry and prevents catalyst elements from being damaged by a non-homogeneous gas stream. The mixer also allows for the unburnt air-fuel mixture to settle inside instead of burning in catalyst elements, thereby preventing the latter from being damaged by suddenly burning deposits.

6 Claims, 11 Drawing Sheets

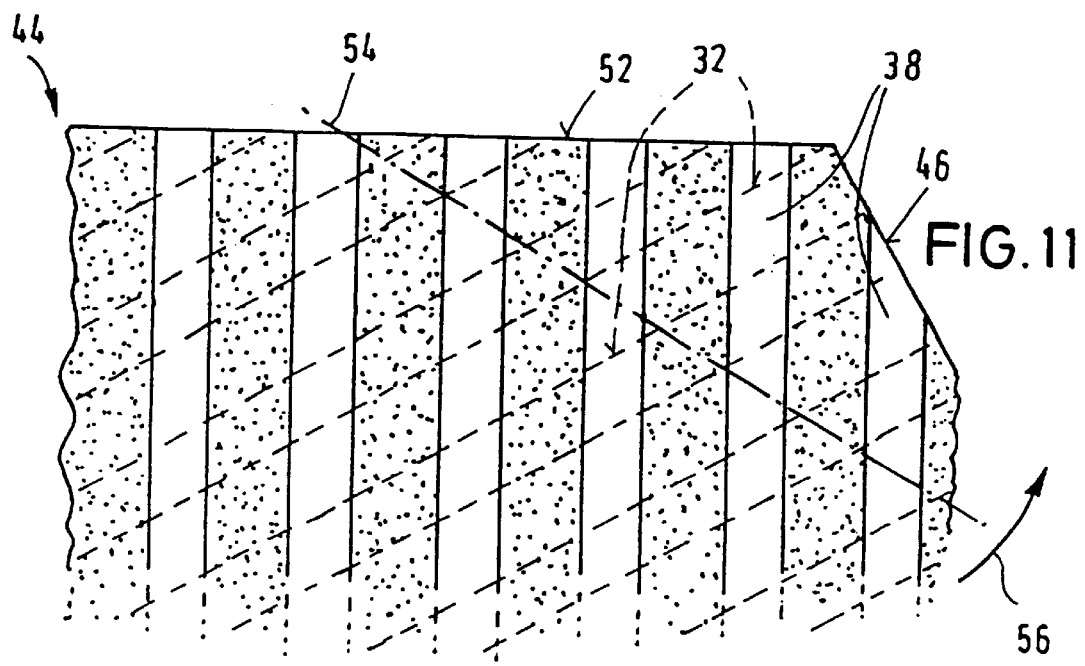
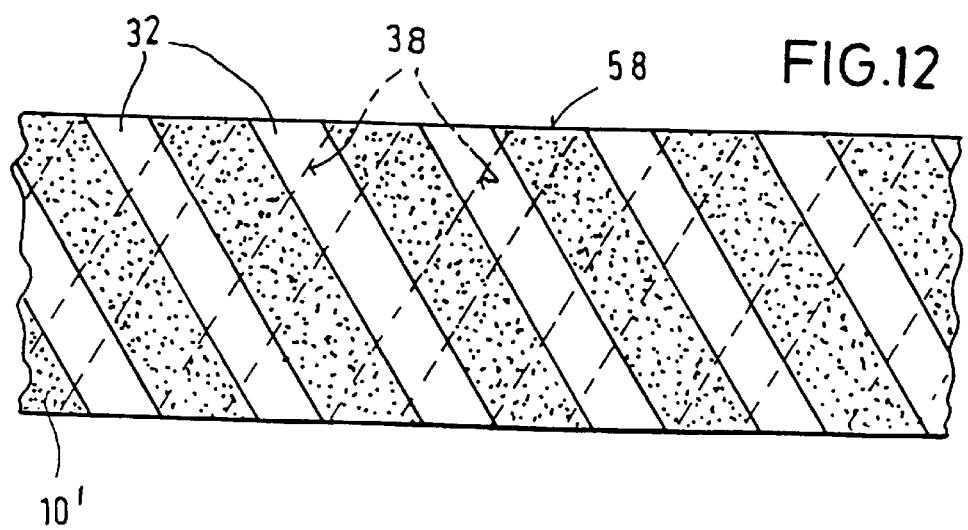

GAS EXHAUST SYSTEM

BACKGROUND OF THE INVENTION

The invention relates to a gas exhaust system for an internal combustion engine, in particular for vehicles.

Gas exhaust systems for internal combustion engines comprise an exhaust manifold in which the connector pipes from the individual combustion chambers are united to form a gas exhaust pipe. Generally, the gas exhaust pipe is directed rearward below the floor subassembly of the vehicle. To clean the flue gas, a catalyst with one or several catalyst elements is arranged in the gas exhaust pipe under the floor subassembly of the vehicle.

The catalytic effect of a coating on a catalyst element becomes active only above a relatively high operating temperature. When the distance between the exhaust manifold and the catalyst is relatively great, the operating temperature of the catalyst is reached only some time after the starting of the internal combustion engine (e.g. after two minutes). Since many vehicles are primarily used for short distance trips, the catalyst has not reached its required operating temperature over a great part of its operating time.

In order to reduce the warm-up time of the catalyst, i.e. the time until it reaches the required operating temperature, additional heating means are used, for example inductive heating of the catalyst, or heating the flue gas flow with gas or gasoline burners or heat accumulators located a short distance in front of the catalyst. The implementation of additional heating means results in an increase in weight, space requirement and cost.

In order to reduce the warm-up time of the catalyst, the catalyst may be located as close as possible to the exhaust manifold. Such an arrangement of the catalyst allows the required operating temperature to be reached very soon after the starting of the internal combustion engine. With this arrangement of the catalyst close to the exhaust manifold unburnt combustion gas mixtures may deposit in the catalyst and be ignited there. The resulting high combustion temperatures, as well as the sudden increase in pressure may cause damage to the catalyst. Pressure variations in the flue gas flow that occur near the exhaust manifold and caused by the delays between the outlet strokes of the combustion chamber, result in a degradation of the efficiency of the catalyst. Further, the distribution of the flow over the cross section of the exhaust pipe is strongly inhomogeneous just behind the exhaust manifold, seen in the flow direction. Due to the inhomogeneity of the flow, local overloads occur in the catalyst that may damage or destroy it.

SUMMARY OF THE INVENTION

It is the object of the invention to provide a gas exhaust system in which the catalyst may be arranged close to the exhaust manifold.

In the present gas exhaust system for an internal combustion engine, a mixer is provided between the exhaust manifold and. the catalyst, the mixer being made of porous temperature-resistant material. The mixer homogenizes the distribution of the flow across the cross section of the exhaust pipe so that resultant local overloads are excluded. Likewise, the mixer compensates for pressure variations caused by the different opening times of the outlet valves. Further, due to its porous structure, the mixer also serves as a filter in which the not combusted combustion mixture deposits. The deposits are burned in the mixer so that a resultant destruction of or damage to the catalyst is excluded. Due to the temperature resistance of the mixer, the mixer is not damaged by the burning of the deposits.

Preferably, the mixer is a ceramic foamed material member. Ceramic foamed material members are porous and further have a high temperature resistance.

To avoid a too great backdraft of the flue gas flow due to the mixer and to improve the homogeneity of the flow distribution over the cross section of the exhaust pipe, the mixer may comprise a number of first channels arranged under an angle to the flow direction. Preferably, the mixer also comprises a number of second channels extending under an angle to the first channels and to the flow direction.

The mixer may be provided at the outlet of the exhaust manifold and within the flue gas pipe between the exhaust manifold and the catalyst. Preferably, the mixer is arranged immediately before the catalyst or within the catalyst housing.

For the production of porous, temperature-resistant mixers, one may use flexible foamed plastic material members wetted with wetting material. By wetting, the entire surface of the structure of the foamed plastic material member is covered with the wetting material, for example, ceramic slip. Thereafter, the wetting material is cured. For curing, the wetted foamed plastic material member is heated to a degree that the foamed plastic material is removed by burning.

For producing a mixer suited for use in the gas exhaust system, the following method is proposed as a particularly advantageous method of production, wherein at least one foamed plastic material member with a top and a bottom surface is formed from a flexible foamed plastic material, the foamed material member being sheared in a first direction about a shear angle by being subjected to a first shearing force, from the top and/or the bottom surface, first channels are formed in the foamed plastic material member thus sheared, the channels being formed under an angle to the normal of the top and/or bottom surface, this angle being different from the first shear angle, and the first shearing force is relaxed and the foamed plastic material member restores itself.

The essential idea this method is based on is to first provide the flexible foamed plastic material structure with channels extending therethrough. For an improved mixing of the fluid passing through the member, these channels extend obliquely to the axial extension of the member. One could form these oblique channels under an angle other than 90° to the top or bottom surface of the foamed material structure or the foamed material member. This, however, makes the production process more difficult, which is due in particular to the flexible structure of the foamed material member. Therefore, in a first variant, it is proposed to shear the foamed material member, i.e., to subject the foamed material member to shearing forces. Now, the channels may be formed under an angle of 90°, in particular, to the top or bottom surface of the sheared foamed material member. When the shearing force acting on the foamed material member is subsequently relaxed so that the foamed material member is in its relaxed state, the channels extending through the foamed material member are oblique.

In the manner described above, first channels extending in a first direction may be formed in a foamed plastic material member. When the foamed plastic material member is sheared in another direction after the forming of the first channels, which direction is preferably opposite to the active direction of the previously applied shearing force, second channels may be formed in the foamed material member extending through the foamed material member in a direction different from that of the first channels. Thus, two groups of channels run through the foamed plastic material member, having different orientations.

Depending on the magnitude of the shearing forces and their effective directions, channels with different degrees of inclination may be formed in a formed plastic material member. The orientation of the channels also depends on the angle under which they are formed in the sheared foamed member.

The process steps of shearing the foamed plastic material member and of forming channels can also be performed simultaneously. To this end, for example, a punching tool may be set on the top or the bottom surface of the undeformed foamed member which is not yet subjected to shearing forces. As soon as the punching tool contacts one side of the foamed member, it is displaced relative to the opposite side of the foamed plastic material member so that shearing forces act on the foamed member. The punching is performed either upon reaching the desired shear angle or already during shearing. Thus, it is sufficient to displace the punching tool during punching, relative to the opposite side of the foamed member so that shearing forces act on the foamed member.

For the channels to be punched in the foamed member to have a possibly circular section, the foamed member may be pressed strongly prior to or after the punching, whereby it is compressed.

In a variant of the process, the channels are formed in a foamed member without shearing the same. In this variant, first channels are formed in an outer surface of a foamed member. Subsequently, the foamed member is cut, the cutting surface extending under an acute angle to the longitudinal extension of the first channels. A foamed member thus cut can be processed further, until a plate material is obtained having parallel top and bottom surfaces, one surface being defined by the cutting surface.

In the variant described above, second channels may be formed in the cutting surface after the cutting of the foamed plastic material member, whereupon the foamed plastic material member is cut again such that this cutting surface extends under an acute angle to all of the channels. When the foamed plastic material member thus cut is processed further so that a plate material or foamed material blocks are obtained, a foamed material structure is produced that is run through by channels extending oblique to each other and that has parallel top and bottom surfaces, at least one of which is defined by the (second) cutting surface.

In the most general form, this advantageous production method provides a foamed material structure through which oblique channels extend, wherein groups of these channels extend in parallel and the channels may be subdivided into a plurality of groups of channels with different relative orientations. Such foamed plastic material members are used, for example, as semi-finished products for producing ceramic foams; reference will be made further below to these materials and the methods based on the foamed material members.

Suitably, a plurality of thus produced foamed material members are superimposed so that a member can thus be produced through which fluid may flow and which has properties of a mixer, all this without restrictions in length incurred by the manufacturing process. The individual foamed material members are preferably made as a plate material of random geometric shape with parallel top and bottom surfaces.

The channels are preferably formed by punching the foamed material member. Such a punching tool comprises two pressing members frictionally contacting the top and bottom surfaces of the foamed material member. When these two pressing members have been brought into frictional engagement with the foamed plastic material member, at least one pressing member is moved relative to the other so that the foamed plastic material member arranged therebetween is sheared. Now, the punching tool can be moved into the foamed plastic material member. Here, it is feasible to compress the sheared foamed plastic material member by moving the pressing members toward each other, such that the holes may be formed by means of punching tools.

It is further suitable to have perforated pressing members so that the punching tools may be advanced through the holes into the foamed plastic material member. In the state in which the foamed plastic material member is punched, the holes of the two pressing means should be flush.

Thus, the method provides for the production of a porous member through which a fluid can flow, the member comprising either a single foamed plastic material member or several superposed foamed plastic material members which or each of which has one channel or a plurality of channels extending under a common oblique angle or under different oblique angles. Due to the porous structure of the foamed plastic material member, these channels are interconnected. When using a plurality of foamed plastic material members, it is suitable to have different, in particular oppositely directed, orientations of the adjoining channels of adjacent foamed material members.

Suitably, the foamed plastic material is an open-cell or a closed-cell material. In particular, polyurethane is used as the foamed plastic material.

Based on the foamed material members made according to the above process, rigid foams, in particular ceramic foams, may be produced by wetting the foamed plastic material member or the several abutting foamed plastic material members with a wetting material. This wetting can be imagined as a wetting of the entire surface of the structure of each foamed plastic material member with the wetting material. Preferably, the wetting material is slip. It is of general importance that the wetting material is cured so that after curing a self-supporting wetted foamed plastic material member is obtained, the dimensional stability and the self-supporting ability thereof being provided by the wetting material. Thus, the porous member thus formed includes, on the one hand, the channels with their inner walls wetted with the wetting material and, on the other hand, the connections between adjacent channels also wetted on their inner walls. Subsequently, this foamed material member wetted with hardened wetting material is heated to a degree that the foamed plastic material is removed by burning. An alternative method of removing the foamed plastic material is an evaporation caused, for example, by a chemical reaction with a corresponding processing gas.

In the manner described above, porous members with channels and with optional length may be made even when the channels have undercuts or similar three-dimensionally varying paths. It is a further advantage of such a mixer (a porous member with channels running therethrough) that it has only a low flow resistance. Of course, one would obtain a fluid flow rate with a porous member, causing, however, a much greater flow resistance than with a porous member produced according to the above method.

Advantageously, the wetting is done by drenching the foamed plastic material member or the group of foamed plastic material members with the wetting material. These methods are known per se from the production of ceramic foams. The ceramic slip is hardened by burning. In the process, the plastic material is removed by evaporation.

When a plurality of adjoining foamed plastic material members are provided with wetting material, it is suitable to interconnect the foamed plastic material members before wetting. Here, it is feasible to weld the foamed plastic material members together by heating their contact surfaces. An alternative to this connection is to couple adjacent foamed plastic material members by means of the cured wetting material.

Since the foamed plastic material member or the group of successive foamed plastic material members is still flexible with the wetting material not yet cured, it can be placed in curved or otherwise shaped molds (such as manifold molds or the like) to be cured in these molds by burning. Thus, the finished product is given a shape that allows for a compact installation in a mixer device or a tubing of such a mixer device.

In this method, it should be underlined as being particularly advantageous that for producing the foamed plastic material members, the conventional production methods for foams may be used. The foams, mostly coming as blocks, merely have to be processed to plate material which will then be sheared in accordance with the present invention so as to form the channels. The production of block foam is rather economic so that, after all, also the rigid members to be flown through by a fluid can be made at relatively low cost, making use, in particular, of the well-known technology of foam production. In particular, no special molds are required for the foam production. Thus, the production process of the present invention uses a semi-finished material, i.e. foamed plastic plate material which is available at extremely low cost. Also the further method steps, especially the forming of the oblique channels is done, according to the present invention, in a simple and, in view of production technology, economic manner.

For manufacturing the mixer suitable for use in the gas exhaust system with channels extending through mixer, a further advantageous method is provided, wherein at least one insert member is placed in a mold, the insert member defining the course and the shape of at least one channel, a foamed plastic material is introduced into the mold so that the at least one insert member is embedded in the foamed plastic material member which is flexible after curing, the foamed plastic material member is removed from the mold and the at least one insert member is removed from the foamed plastic material member, the surface of the foamed plastic material member is wetted with a curable wetting material, and the foamed plastic material of the foamed plastic material member wetted with wetting material is removed by heating the same so that a porous member made from the wetting material and adapted to be flown through by a fluid is obtained.

It is the principle idea of the method to first provide a flexible foamed material structure with channels running therethrough. According to the invention, this is done by providing foamed plastic material around an insert member representing the course of the later channel and by embedding the same therein. Alternatively, a plurality of such insert members may be used. The insert members may have a structure changing in all three dimensions so that eventually not only straight, but also curved channels may be produced.

The foamed plastic material is flexible after curing so that the insert members can be pulled from the foamed plastic material. Thereafter, a foamed plastic material member is left through which extend one or a plurality of straight or curved channels, the channels being in communication due to the porous structure of the foamed plastic material. The foamed plastic material suitably is an open-cell or a closed-cell material. In particular, polyurethane is used as the foamed plastic material.

After the insert member(s) has (have) been removed from the foamed plastic material member, the foamed plastic material member is wetted with a wetting material. This wetting can be imagined as a wetting of the entire surface of the structure of each foamed plastic material member with the wetting material. Preferably, the wetting material is slip. It is of general importance that the wetting material is cured so that after curing a self-supporting wetted foamed plastic material member is obtained, the dimensional stability and the self-supporting ability thereof being provided by the wetting material. Thus, the porous member thus formed includes, on the one hand, the channels with their inner walls wetted with the wetting material and, on the other hand, the connections between adjacent channels also wetted on their inner walls. Subsequently, this foamed material member wetted with hardened wetting material is heated to a degree that the foamed plastic material is removed by burning.

In the manner described above, porous members with channels and with optional length may be made, even when the channels have undercuts or similar three-dimensionally varying paths. Such a member may be employed as a catalyst, if, for example, a catalytically active layer is applied. With or without this additional layer, it may anyway be used as a chemical mixer homogenizing a fluid mixture flow passing through, thereby mixing the fluids. It is a further advantage of such a mixer (a porous member with channels running there-through) that it has only a low flow resistance. Of course, one would obtain a fluid flow rate with a porous member, causing, however, a much greater flow resistance than with a porous member produced according to the above method.

According to a further advantageous variant, the mixer of the gas exhaust system may be produced by producing a wavy flexible mat of foamed plastic material, winding the mat into a foamed plastic material member, wetting the surface of the foamed plastic material member with a curable wetting material, and removing the foamed plastic material of the foamed plastic material member wetted with wetting material by hating the same, so that a porous member made from the wetting material and adapted to be flown through by a fluid is obtained.

With this production variant, a wavy flexible mat of open-cell or closed cell foamed plastic material is produced which is then rolled into a (wound) member. The foamed plastic material member thus formed is penetrated by channels that are formed between the valleys and the peaks of adjacent windings of the wavy flexible mat. For example, the wound member retains its wound structure by using an adhesive.

The insert members may be rigid or, preferably, flexible and/or inflatable. After the foamed plastic material member has been produced, the insert members inflated until then may be deflated or relaxed so as to be removed from the foamed plastic material member. Should the insert members not be inflatable, but flexible, they may readily be pulled from the foamed material due to their flexibility.

After the forming of the wound member, another wetting with wetting material is performed, the material being allowed to cure. Thereafter, the member thus made is heated to remove the foamed plastic material. The advantages to be obtained with the porous member of this variant are identical to those described for the first variant of the invention. In addition, the manufacturing process of the second manufacturing variant is simpler since no insert members are embedded in the foamed plastic material member that have to be withdrawn from the cured, but still flexible foamed plastic material.

The following is a detailed description of the invention using a preferred embodiment of the gas exhaust system of the invention and several methods of producing a mixer provided in the gas exhaust system, making reference to the accompanying drawings. In the Figures:

BRIEF DESCRIPTION OF THE DRAWINGS

FIGS. 9 to 12 are schematic illustrations of the individual production steps for forming an foamed plastic material member penetrated by oblique channels according to an alternative embodiment of the production method.

DESCRIPTION OF THE PREFERRED EMBODIMENTS

Figure 1:
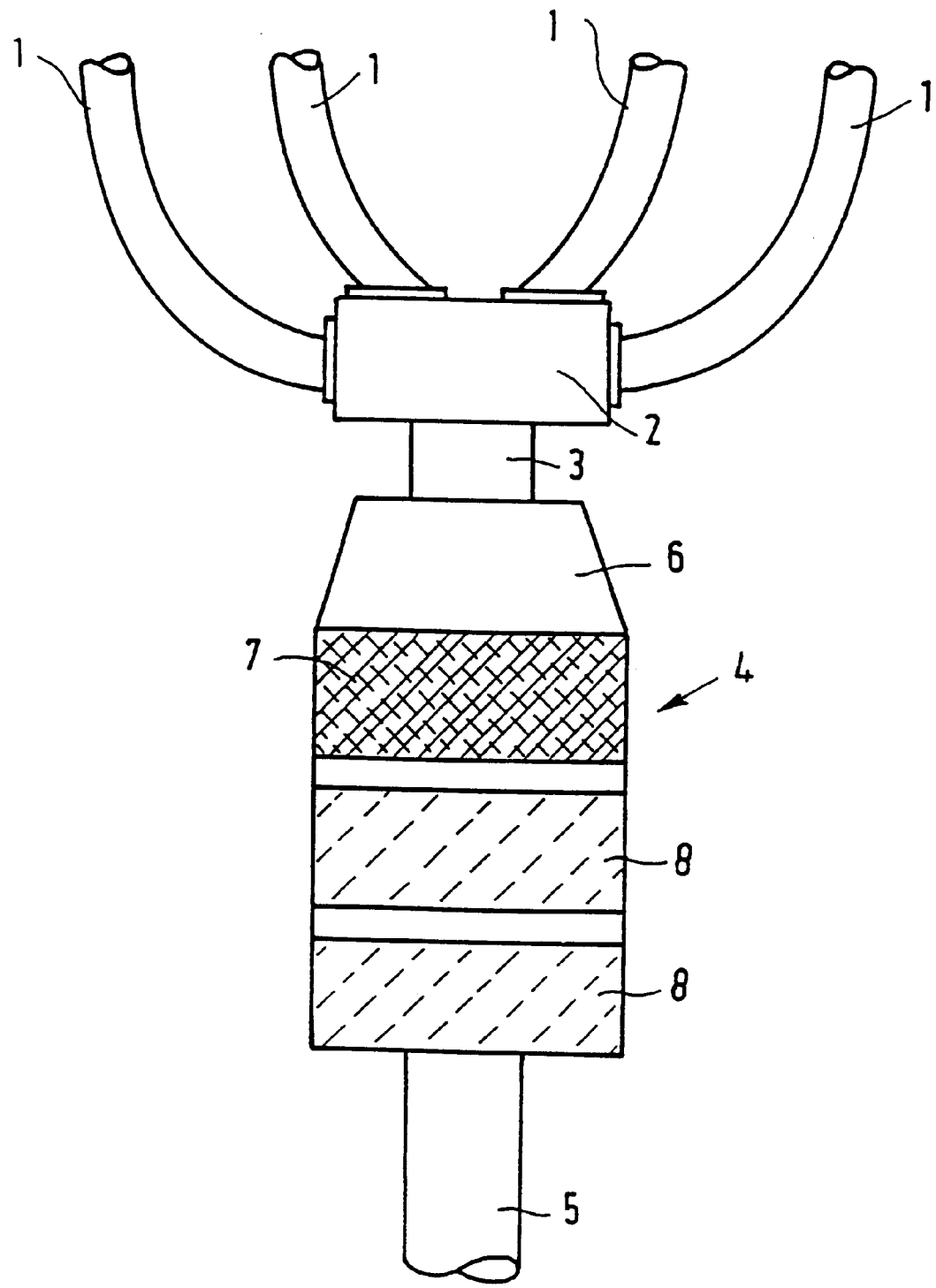
FIG. 1 is a schematic illustration of a gas exhaust system with a mixer provided in a catalyst housing.

A gas exhaust system (FIG. 1) is a gas exhaust system of a four cylinder internal combustion engine and comprises four connecting pipes 1 guided into an exhaust manifold 2. The exhaust manifold 2 is connected with an exhaust pipe 3 through which the flue gases are vented from the exhaust manifold 2. Thus, the exhaust manifold 2 joins all flue gases passed through the connecting pipes 1 and directs them into a single exhaust pipe 3. With multi-cylinder internal combustion engines, it is also known not to use a single exhaust manifold into which all flue gases are directed, but a plurality of intermediate exhaust manifolds into which, for example, two connecting pipes are directed. An exhaust manifold is connected with the intermediate exhaust manifolds, in which the pipes from the intermediate exhaust manifolds are joined.

The gas exhaust pipe 3 is connected with a catalyst 4 so that flue gases are passed through the exhaust pipe 3 into the catalyst 4. The outlet of the catalyst 4 is connected with an end pipe of the gas exhaust system 5 from which the flue gases exit or from which they are directed into so-called mufflers.

The catalyst 4 comprises a catalyst housing 6 accommodating a mixer 7 and two catalyst elements 8. The combustion gases flowing into the catalyst 4 from the exhaust channel 3 are mixed by the mixer 7 that extends over the entire cross section of the cylindrical catalyst housing 6. Further, the mixer 7 homogenizes the pressure over time, which varies as a function of the different opening times of the outlet valves. The mixer 7 homogenizes the march of pressure over the cross section of the catalyst housing 6 and over time. Further, the mixer 7 acts as a filter filtering unburnt combustion gas mixtures from the flue gas flow. Therefore, the catalyst elements 8 are fed with a flue gas flow homogenized over the cross section and over time, which is also free of not combusted combustion mixtures. Therefore, the catalyst elements 8 are not damaged and have a high efficiency if the catalyst 4 is provided immediately behind the exhaust manifold 2.

Moreover, the flue gas flow is homogenized by the diameter of the inlet opening, at which the feed pipe 3 opens into the catalyst housing 6, is smaller than the diameter of the catalyst housing 6 in the flow direction immediately after the inlet opening. Due to this sudden increase in diameter, the flue gas flow enters the catalyst 4 as a free jet and expands therein as a free jet until it reaches the mixer 7. A free jet is a flow that is not limited by pipe walls or the like and which can therefore expand freely in the radial direction.

Due to the mixer 7, it is also possible to comprise the exhaust manifold 2 and the catalyst 4 in a unit.

Referring to the subsequent Figures, the following is a description of different production methods for the mixer 7 of porous temperature resistant material.

In a preferred method of production, foamed material is used which is produced in blocks in standard production sizes (for example, 60 m×1.5 m×0.8 m). In particular, this foamed material is closed-cell material processed in a second process known per se with controlled pressure waves or explosions so that the closed cells of the foamed material are opened. Thus, a block of foamed material with open pores is obtained.

Figure 2:
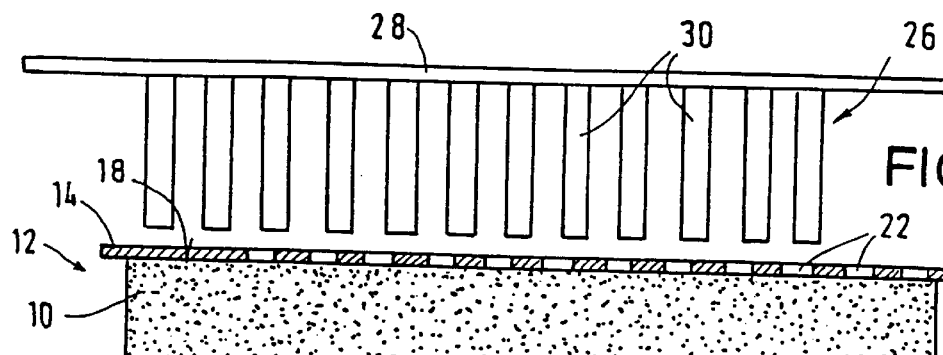
FIGS. 2 to 6 are schematic illustrations of the individual production steps for forming an foamed plastic material member penetrated by oblique channels.

This foamed material block is cut, for example, to foamed material mats 10 (also referred to above as foamed material member or foamed plastic material member) of 25 mm in thickness (plate material). According to the method of FIGS. 2 to 6, each of these mats 10 is placed into a tool 12 comprising two parallel perforated pressing or contact plates 14, 16 adapted to be approached and moved apart. The upper perforated plate 14 contacts the top surface 18 of the foamed material mat 10, while the lower perforated plate 16 contacts the bottom surface 20 of the foamed material mat 10. This situation is depicted in FIG. 2.

Figure 3:
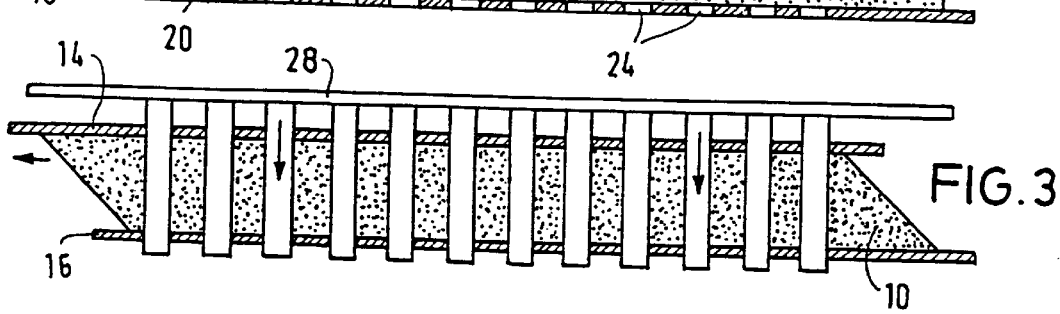

By moving at least one of the perforated plates 14, 16 in the plane of their extension, the foamed material mat 10 is sheared as illustrated in FIG. 3. To this end, the plates 14, 16 must contact the foamed material mat 10 with a certain static friction. It is possible, for example, to provide the plates 14, 16 with thorns or similar projections that penetrate into the top or bottom surface 18, 20 where they hook.

After relative displacement of the two plates 14, 16, the holes 22 in the upper plate 14 are flush with the holes 24 provided in the lower plate 16. Thereafter, the plates 14, 16 are approached so that the foamed material mat 10 therebetween is compressed in the sheared state by elastic deforming (not illustrated in FIGS. 2 to 12). Now, a punching tool 26 may be advanced through the coincident holes 22, 24 and the foamed material mat 10 provided therebetween. The punching tool 26 comprises a support plate 28 with, in particular, tubular cutting or punching elements 30 projecting from the support plate 28 according to the pattern and the arrangement of the holes 22 and 24. Using these cutting and punching elements 30, first channels 32 may be formed in the sheared foamed material mat 10, as illustrated in FIG. 3.

Figure 4:
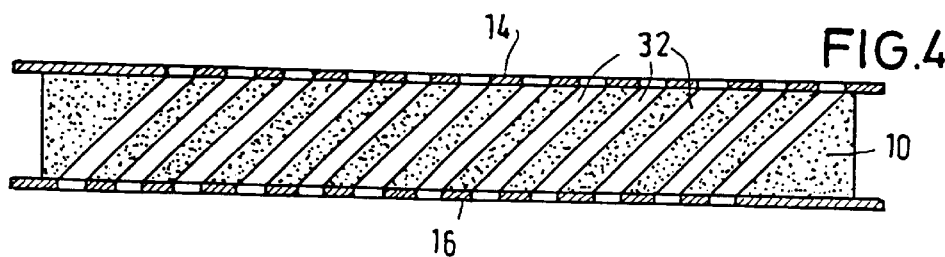

After this process, the two pressing plates 14, 16 are returned to their home positions so that the foamed material mat 10 again takes its initial shape (relaxed state). As illustrated in FIG. 4, the channels 32 formed in the direction of the normal to the top and bottom surfaces 18, 20 of the sheared foamed material mat 10 now extend obliquely, the angle depending on the shearing previously applied to the mat 10.

Thus, the process described above unwinds such that the foamed material mat 10 is first more or less strongly compressed by the pressing plates 14, 16 and sheared to take a trapezoidal shape. Then, the punching is performed in the direction of the normal to the top and bottom surfaces of the foamed material mat 10. After the withdrawal of the punching tool 26 and after the foamed material mat 10 has relaxed, channels 32 are provided therein with an orientation under an angle to the normal of the top and bottom surfaces of the foamed material mat 10.

Figure 5:
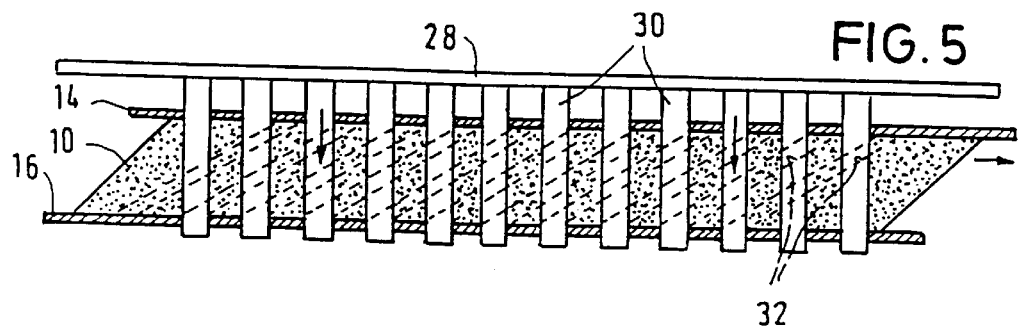
Figure 6:
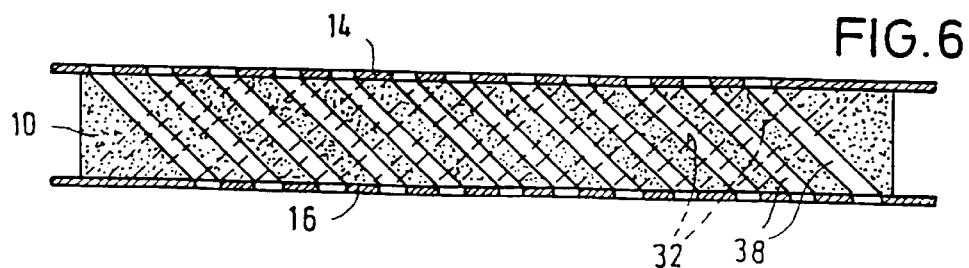

According to the above process, a first group of first channels 32 arranged in a plurality of first rows 34 are formed in the foamed material mat 10. A plurality of second channel rows 36 with second channels 38 orientated opposite to the previous channel rows 34, are created by shearing the foamed material mat 10 between the pressing plates 14, 16 in the direction opposite to that of the former step and by subsequently forming the channels 32 using the punching tool 26 that is moved transverse to the traveling direction of the pressing plates 14, 16 (FIG. 5). Thus, the foamed material mat 10 may be provided with a plurality of adjacent rows 34, 36 of channels 32, 34, the first channels 32 of one and the same row extending in parallel, while the second channels 38 of adjacent rows 36 are orientated in the opposite direction.

Figure 7:
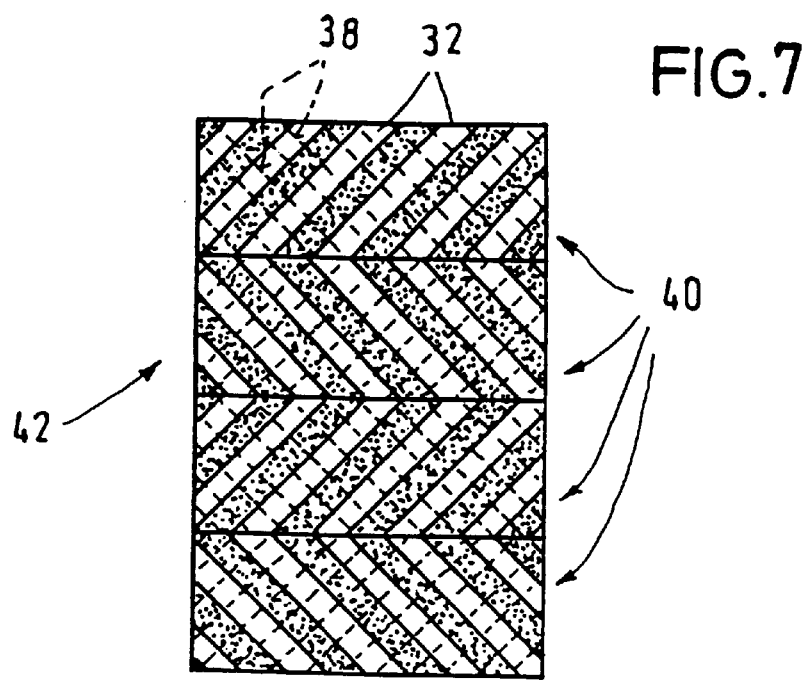
FIG. 7 is a sectional view through a foamed material member formed from a plurality of foamed plastic material members according to FIGS. 2 to 6.
Figure 8:
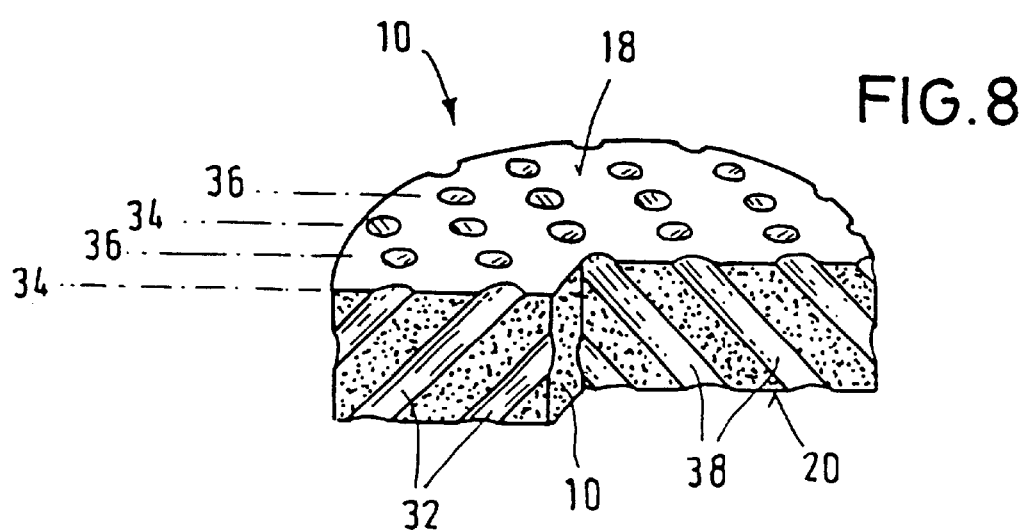
FIG. 8 is a perspective view of a foamed plastic material member, partly broken away.
Figure 9:
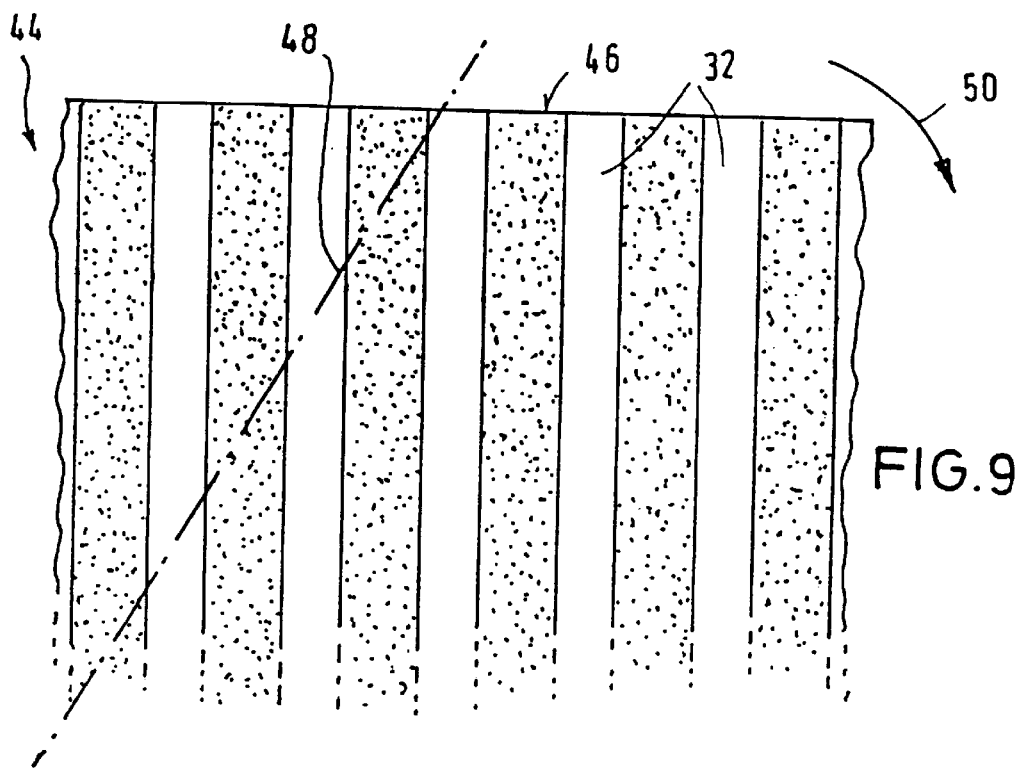

Pieces are cut from the foamed material mats 10 made according to the above described method, the shape of which corresponds to. the cross section of the member through which fluid is to flow. For example, cylindrical members 40 may be cut from the foamed material mats 10 (FIG. 8). In FIG. 7, a plurality of such cylindrical members 40 are abutted axially so that the arrangement of cylindrical members 42 thus obtained is penetrated by channels that, in portions, run in zigzag and, thus, in opposite senses.

In a further step, the entire structure 42 is wetted with slip that is cured subsequently. The cured slip connects the individual cylindrical pieces 40 which form a single unit, namely the porous member. The slick is burned out so that a member is obtained that is made of ceramic foamed material. This member has no plastic material on itself, since the same evaporates during burning.

Figure 10:
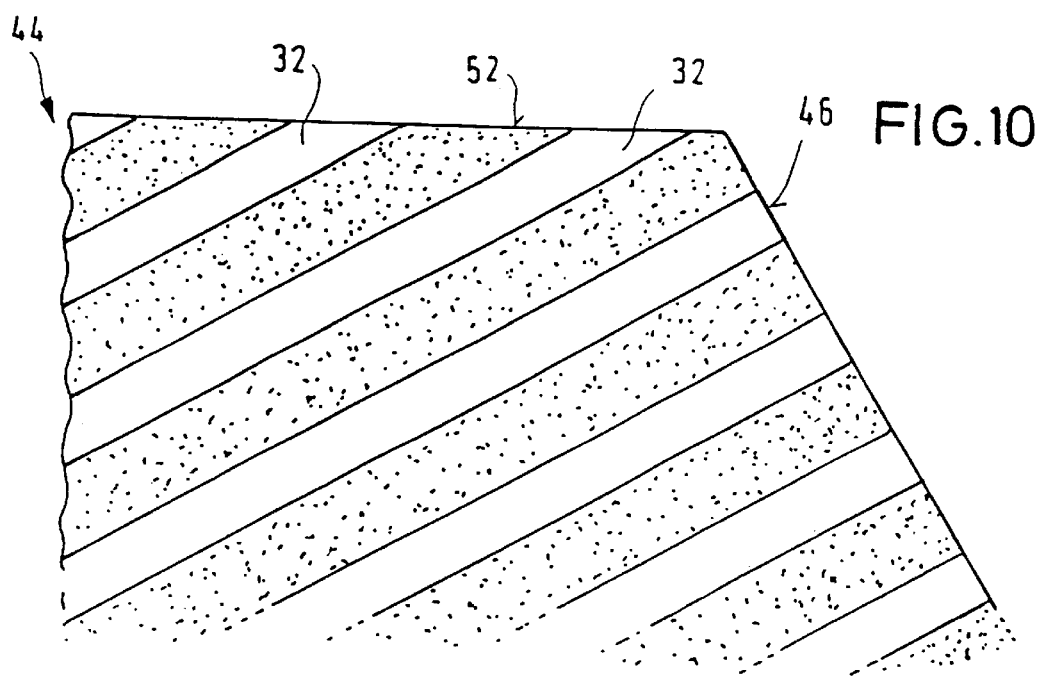

An alternative production process for making a foamed material member 10' with penetrating first and second channels 32, 38 is described in the following in connection with the schematic illustrations in FIGS. 9 to 12. Starting from a block foam material 44, first channels 32 are formed in one of its outer surfaces 46. These channels 32 extend substantially at right angles to the extension of the outer surface 46 in which they are formed. Subsequently, the foamed block 44 is cut along line 48. After rotation of the cut foamed block 44 in the direction of the arrow 50 in FIG. 9, the situation of FIG. 10 is obtained, in which the cutting surface 52 defined by the cutting surface 48 is arranged on top and extends under an acute angle to the extension of the first channels 32.

According to FIG. 11, second channels 38 are then formed in this cutting surface 52, which channels in turn extend substantially at right angles to the cutting surface 52. Thereafter, the foamed block 44 thus penetrated by the first and second channels 32, 38 is cut along the line 54. After rotation of the thus cut foamed block 44 in the direction of the arrow 56, the situation illustrated in FIG. 12 is obtained, where the cutting surface 58 resulting at the cutting surface 54 is on top. By suitable trimming, the foamed material mat 10' is obtained that is penetrated by crossing first and second channels 32, 38.

Figure 13:
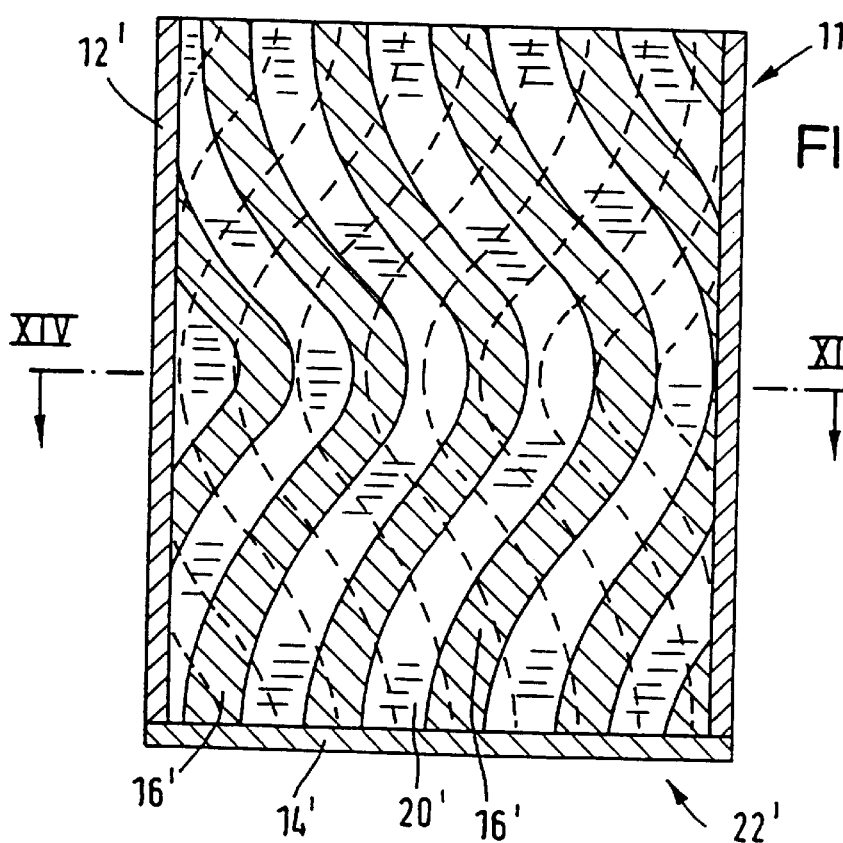
FIGS. 13 to 17 illustrate the individual production steps for forming an foamed plastic material member penetrated by oblique channels according to another embodiment.
Figure 14:
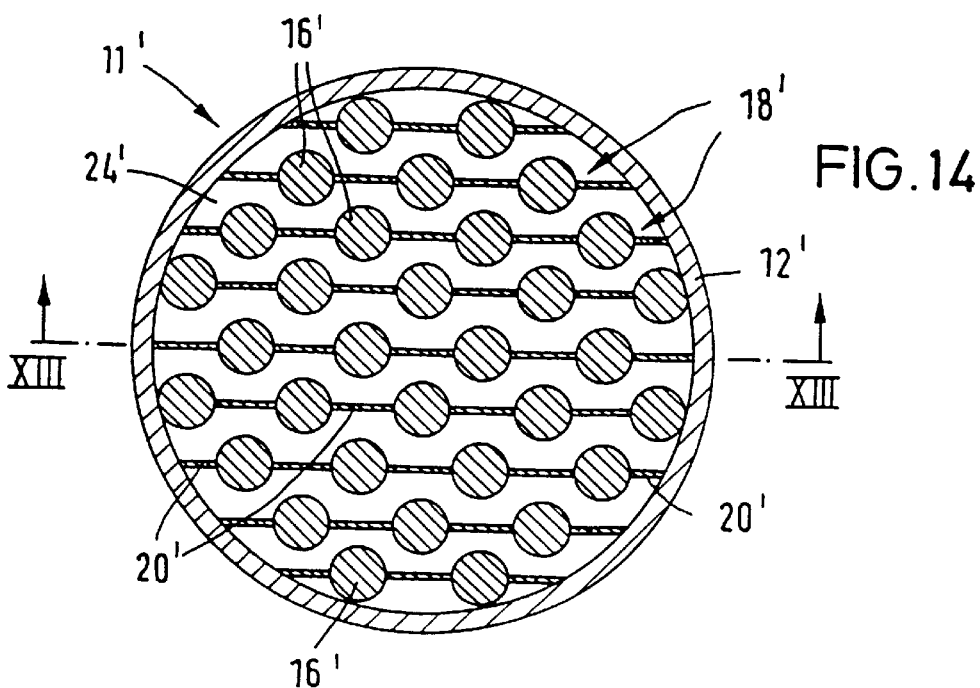

FIG. 13 is a longitudinal section through a cylindrical mold 11' formed by a sleeve 12' and a bottom member 14' closing one of the front ends thereof. A plurality of serpentine-shaped substantially beads 16' project from the bottom member 14' which, as is particularly evident from FIG. 14, are arranged side by side in a plurality of parallel rows 18'. The serpentine-shaped beads 16' of each row 18' are interconnected by thin connecting webs 20'. Like the beads 16', these thin connecting webs 20' extend over the entire axial length of the mold 11'. Further, these thin connecting webs 20' extend from the beads 16' adjacent the sleeve 12' to the inner wall of the sleeve 12'. The bottom plate 14' with its projecting beads 16' and the connecting webs 20' forms an insert member 22' for insertion into the sleeve 12' of the mold 11'.

Figure 15:
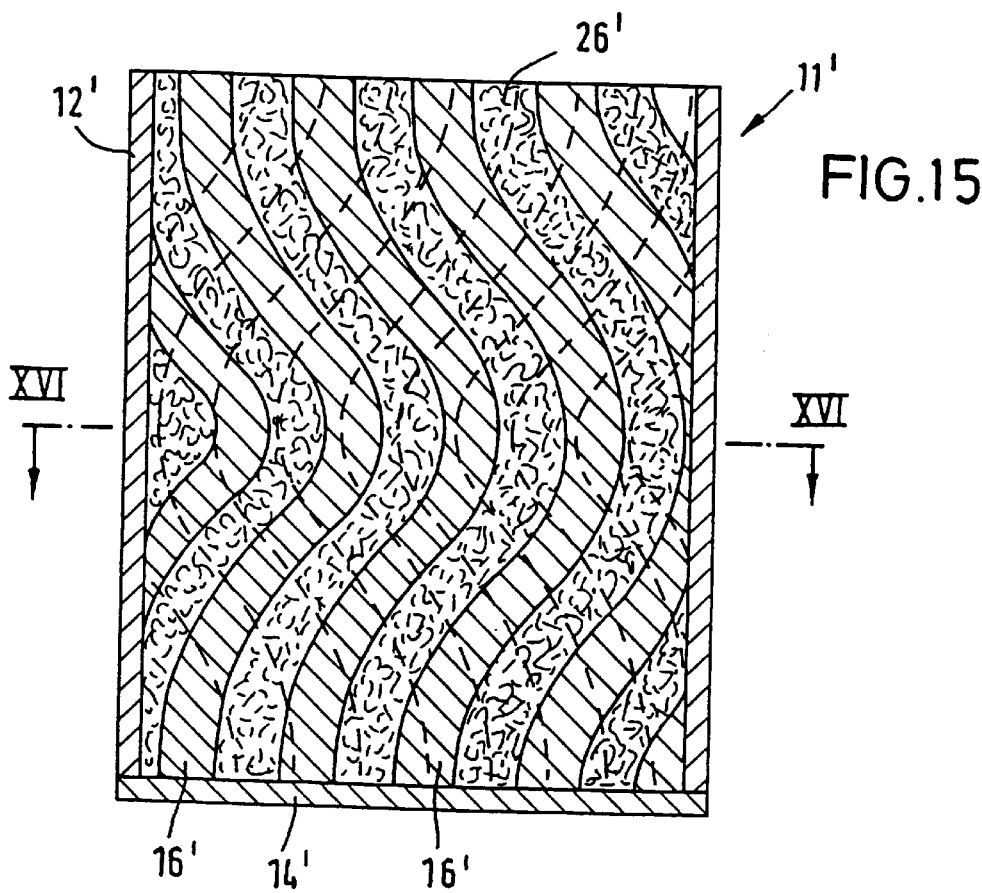
Figure 16:
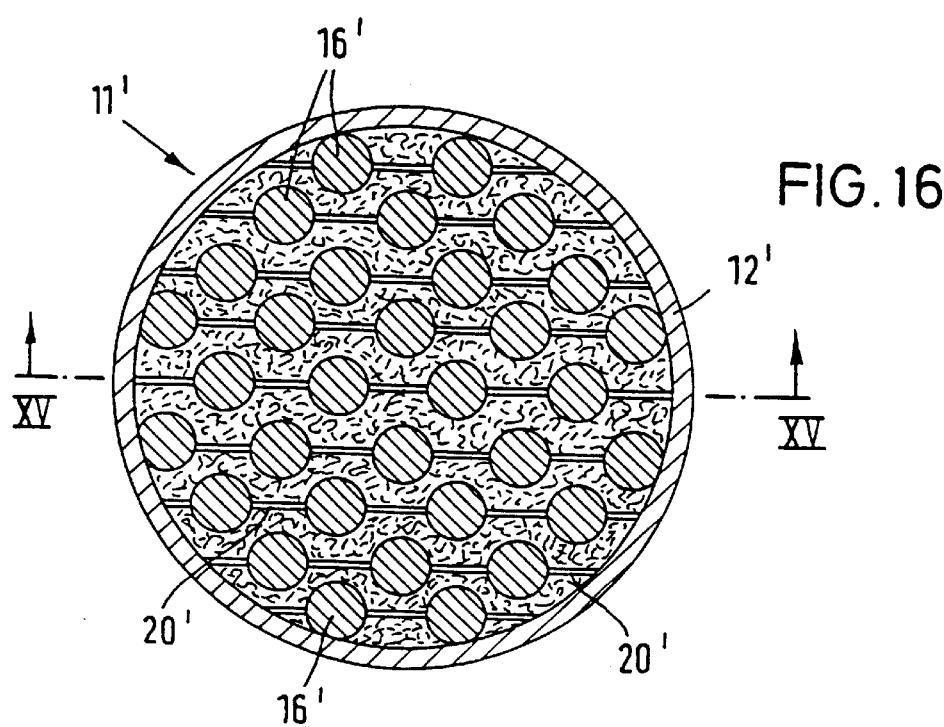
Figure 17:
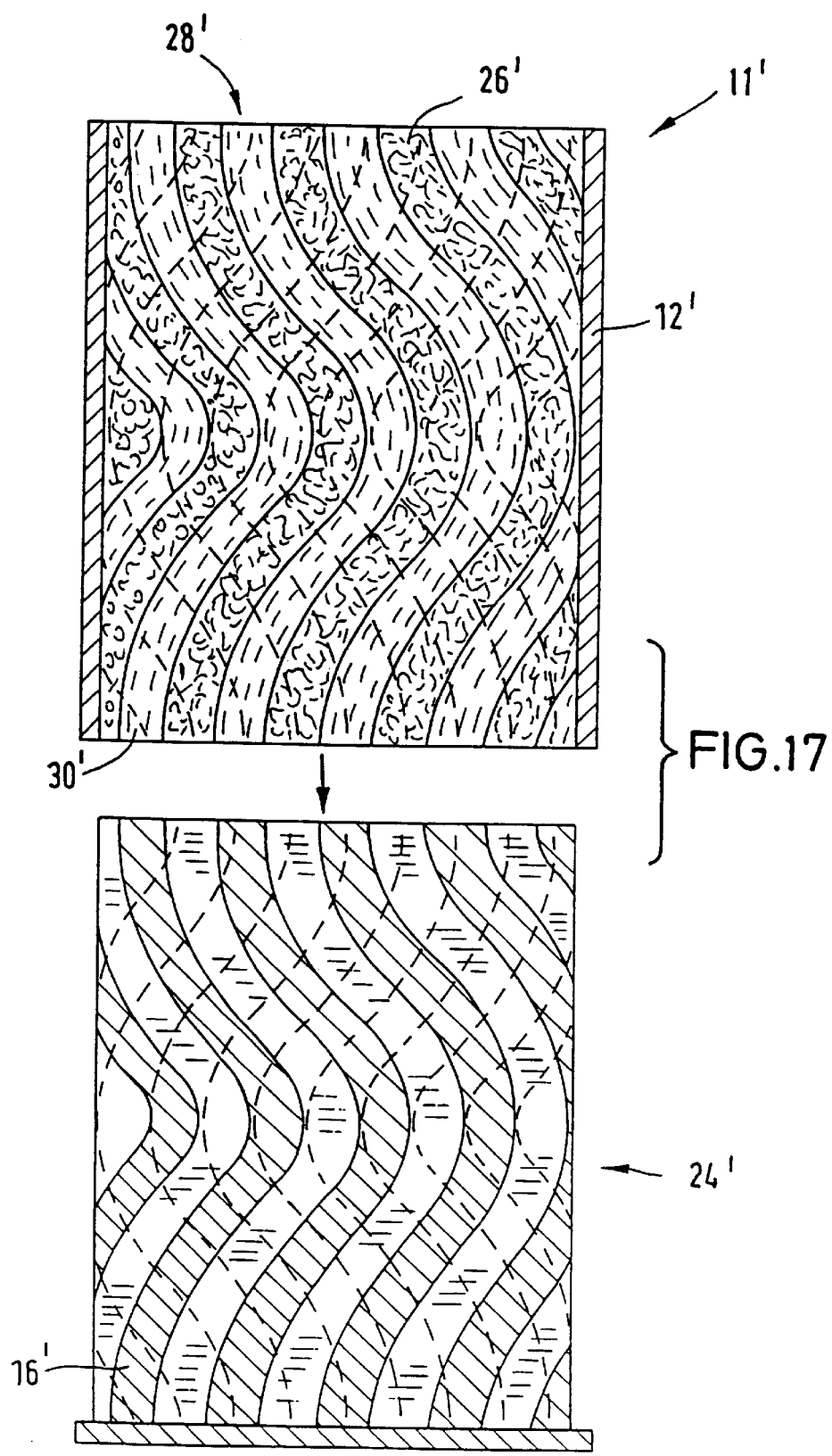

As is particularly evident from FIG. 14, cavities 24' are formed between adjacent rows 18' of beads 16' and connecting webs 20'. In the step represented in FIG. 15, these cavities 24' are filled with a PU foamed plastic material 26'. This foamed plastic material 26' remains flexible even after curing so that the entire insert member 22' can be pulled from the mold 11', as illustrated in FIG. 17. In this manner, a shaped PU member 28' is formed that has through going channels 30' the path of which is determined by the extension of the beads 16'.

Alternatively, it may be provided to remove the foamed plastic material 26' from the sleeve 12' together with the insert members 22' still embedded therein, and to remove the insert members 22' from the foamed plastic material 26' only subsequently. In principle, it can be a further advantage to design the sleeve 12' as two parts to facilitate the removal of the foamed plastic material 26', eventually together with the insert members 22'.

Subsequently, this shaped PU member 28' is taken from the sleeve 12' of the mold 11' and drenched with ceramic slip. After the curing of the ceramic slip, the ceramic member is heated so that the foamed plastic material is removed by evaporation. The finished product then is a ceramic mixer penetrated by individual channels 30 which are in fluid communication with each other due to the porous structure of the ceramic material.

Figure 18:
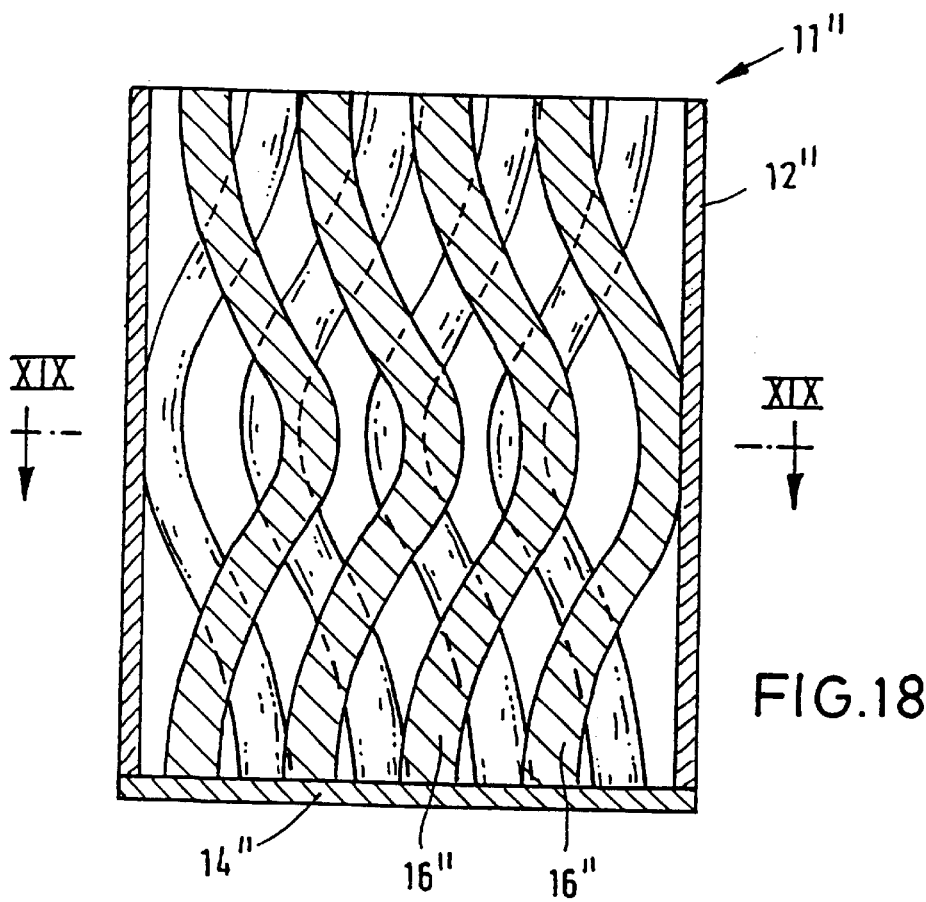
FIGS. 18 and 19 illustrate the molds and insert members necessary for producing a flexible foamed plastic material member with penetrating channels, according to a further embodiment.
Figure 19:
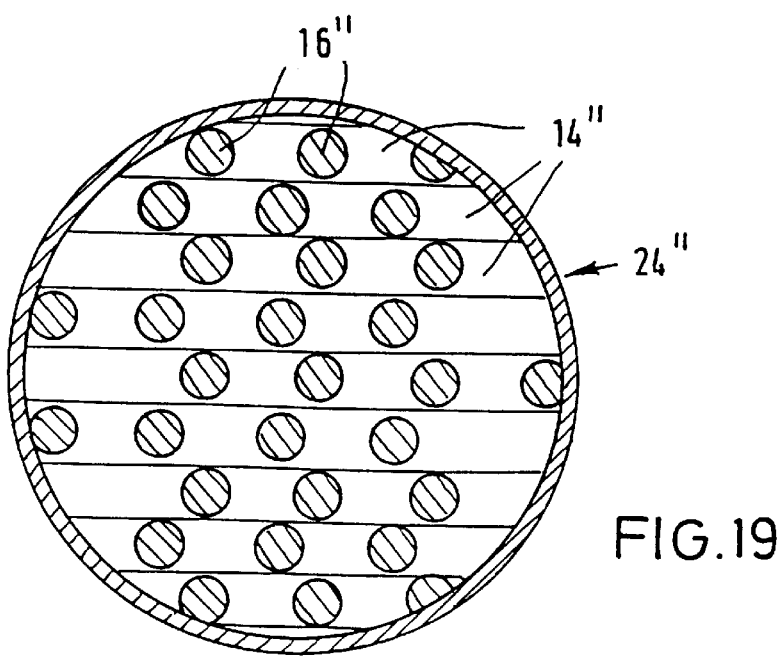

FIGS. 18 and 19 illustrate an alternative mold 11" to the mold 11', the former having a cylindrical wall 12". From one of the two front ends, a plurality of insert members 24" is placed into the mold 11", the insert members comprising a straight and narrow strip-shaped bottom member 14" with a plurality of projecting serpentine-shaped beads 16" that are cylindrical in section. The individual serpentine-shaped beads 16" may be interconnected by continuous webs, however, this is not imperative. As is visible in FIG. 19, the individual strip-shaped insert members 14" abut closely, thereby filling the entire cross section of the sleeve 12" of the mold 11".

The technique of producing a ceramic foamed material member using the mold 11" of FIGS. 18 and 19 is performed analogously to the method of production described for FIGS. 13 to 17. After the foamed plastic material has cured, while it is still flexible, the individual insert members 24" are pulled out. The foamed plastic material member thus obtained is the wetted with ceramic slip by drenching so as to be heated after curing in order to remove the foamed plastic material.

Figure 20:
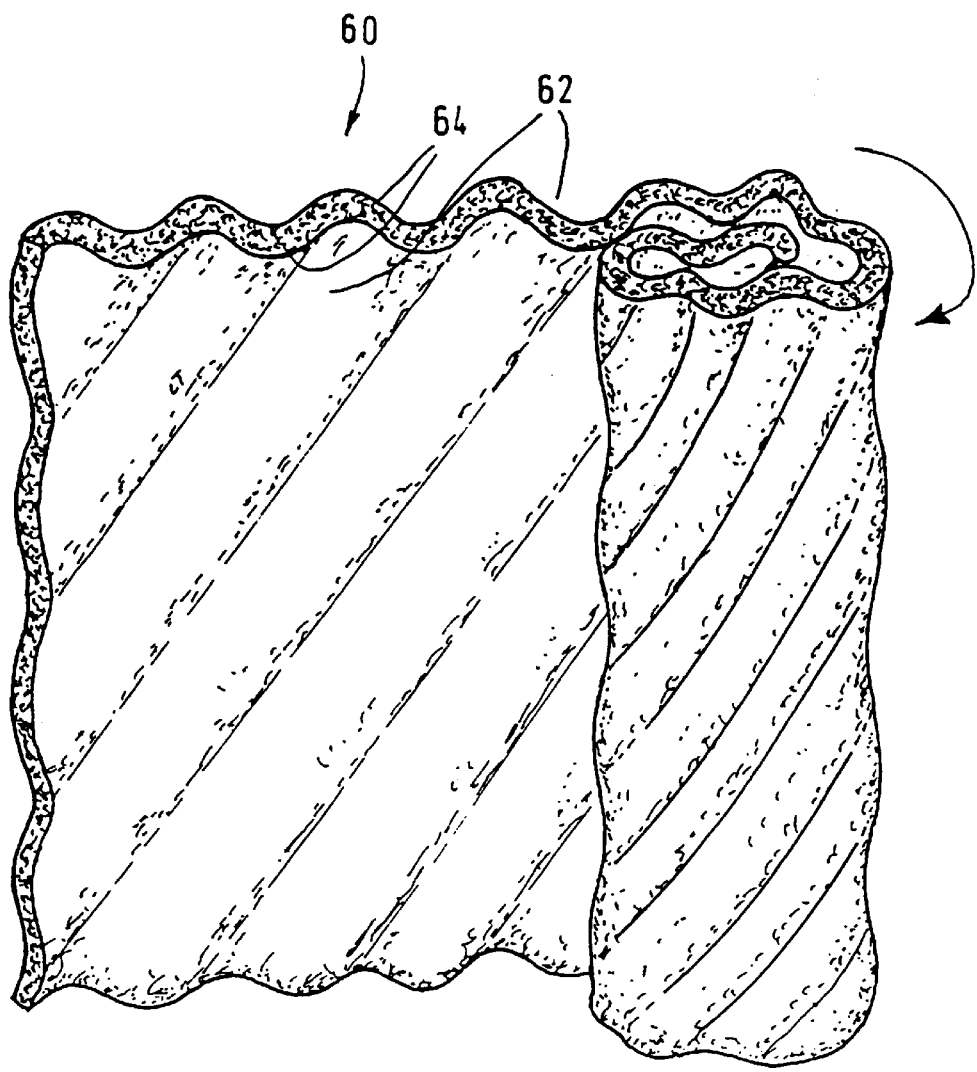
FIGS. 20 and 21 illustrate the production of a flexible foamed plastic material member with penetrating channels, according to a further embodiment, i.e. by winding.
Figure 21:
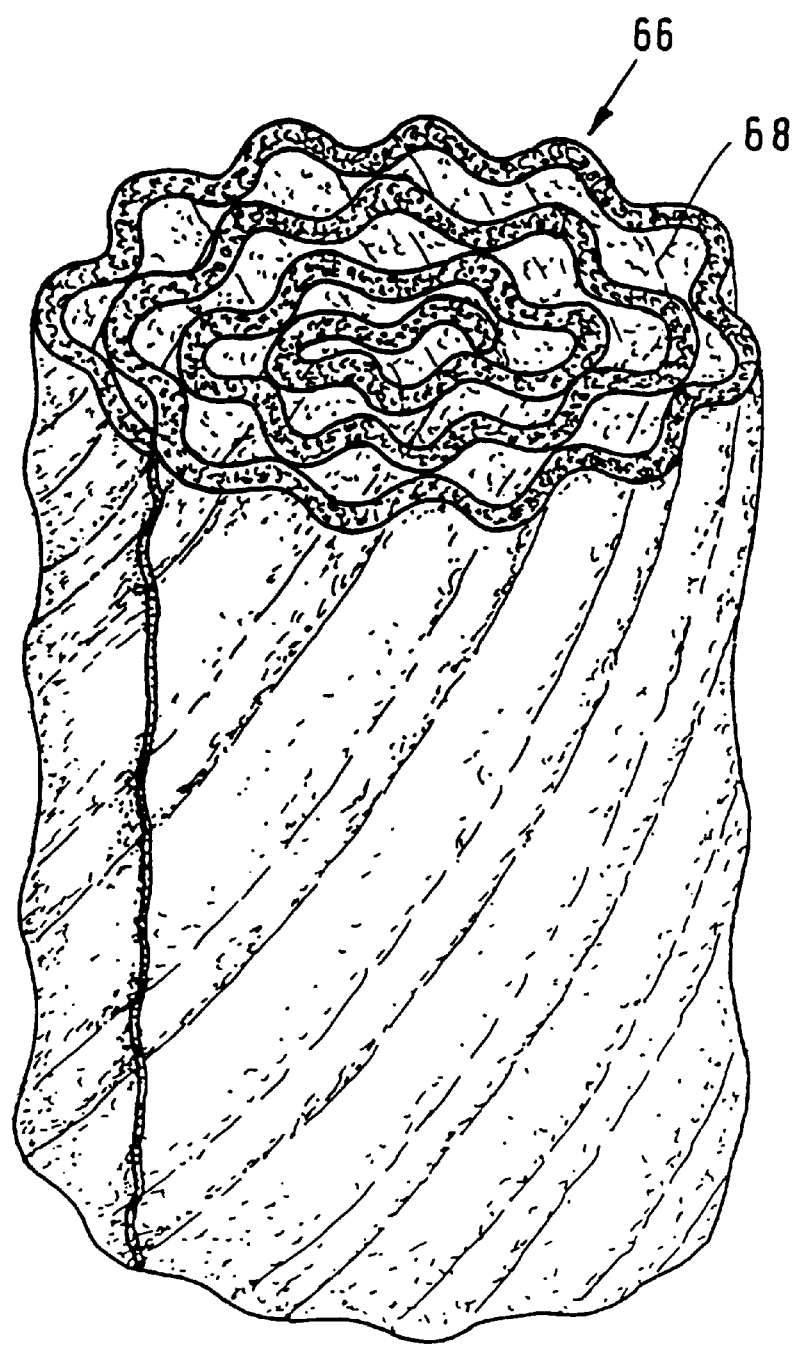

FIGS. 20 and 21 represent another alternative to the method of production of a ceramic foamed material member.

This production variant first provides for creating a wavy mat 60 of flexible foamed plastic material. This mat 60 has angularly extending straight recesses 62 and raised portions 64. Winding the mat 60 into a wound member 66 (see FIG. 21) yields a structure of foamed plastic material penetrated in its axial direction by a plurality of channels 68. The wound member 66 is fixed in its shape particularly by means of adhesive and is wetted with ceramic slip. The ceramic foam thus obtained after curing is heated to remove the plastic material by evaporation.

Although a preferred embodiment of the invention has been specifically illustrated and described herein, it is to be understood that minor variations may be made in the apparatus without departing from the spirit and scope of the invention, as defined the appended claims.

What is claimed is:

1. A gas exhaust system for an internal combustion engine comprising:

an exhaust manifold (2), a catalyst element (8) arranged downstream of the exhaust manifold (2) in the flow direction, a mixer (7) of a porous temperature-resistant material arranged between the exhaust manifold (2) and the catalyst element (8), the mixer (7) includes a plurality of rows of first channels (32) arranged at a first angle to the flow direction and a plurality of rows of second channels (38) arranged at a second angle to the flow direction, the first and second angles of the respective first and second channels (32, 38) being in crossing relationship to each other, and the first and second rows of the respective first and second channels (32, 38) being in immediate alternating relationship to each other.

2. The gas exhaust system of claim 1 wherein the mixer (7) is a ceramic foamed material member.

3. The gas exhaust system of claim 1, wherein the mixer (7) is cylindrical and the channels extend from a top surface to a bottom surface of the mixer (7).

4. The gas exhaust system of claim 1 wherein the mixer (7) is arranged immediately in front of the catalyst (4) relative to the flow direction.

5. The gas exhaust system of claim 1 wherein the mixer (7) is arranged within a catalyst housing (6).

6. The gas exhaust system of claim 1 wherein the mixer (7) and the catalyst (4) are arranged immediately behind the exhaust manifold (2) relative to the flow direction.

* * * * *